(12) United States Patent
Milton

(10) Patent No.: US 8,616,506 B2
(45) Date of Patent: Dec. 31, 2013

(54) CABLE LEAD-THROUGH DEVICE

(75) Inventor: Stefan Milton, Ramadala (SE)

(73) Assignee: Roxtec AB, Karlskrona (SE)

( * ) Notice: Subject to any disclaimer, the term of this patent is extended or adjusted under 35 U.S.C. 154(b) by 302 days.

(21) Appl. No.: 12/451,700

(22) PCT Filed: May 14, 2008

(86) PCT No.: PCT/SE2008/050558
§ 371 (c)(1),
(2), (4) Date: Feb. 24, 2010

(87) PCT Pub. No.: WO2009/022960
PCT Pub. Date: Feb. 19, 2009

(65) Prior Publication Data
US 2010/0187371 A1   Jul. 29, 2010

(30) Foreign Application Priority Data
May 29, 2007   (SE) .................................... 0701304

(51) Int. Cl.
*F16L 3/12*   (2006.01)

(52) U.S. Cl.
USPC ............ 248/74.1; 248/68.1; 248/74.4; 248/65

(58) Field of Classification Search
USPC ............... 248/65, 68.1, 74.3, 74.4, 73, 316.6; 174/134, 64, 40 R
See application file for complete search history.

(56) References Cited

U.S. PATENT DOCUMENTS

| | | | |
|---|---|---|---|
| 2,354,919 A * | 8/1944 | Lockwood | 248/68.1 |
| 2,355,742 A * | 8/1944 | Morehouse | 248/68.1 |
| 2,396,836 A * | 3/1946 | Ellinwood | 174/135 |
| 2,404,531 A * | 7/1946 | Robertson | 248/68.1 |
| 3,742,119 A | 6/1973 | Newman | |
| 4,775,121 A * | 10/1988 | Carty | 248/68.1 |
| 4,884,774 A | 12/1989 | Rodi et al. | |
| 4,958,256 A | 9/1990 | Parkhomenko et al. | |
| 5,014,938 A | 5/1991 | Potzas | |
| 5,064,967 A | 11/1991 | Singbartl | |
| 5,245,131 A | 9/1993 | Golden | |
| 5,366,496 A | 11/1994 | Dahl et al. | |
| 5,377,939 A * | 1/1995 | Kirma | 248/68.1 |
| 5,787,219 A * | 7/1998 | Mueller et al. | 385/134 |
| 6,002,088 A * | 12/1999 | Ehmann | 174/657 |

(Continued)

FOREIGN PATENT DOCUMENTS

| DE | 4434202 | 9/1995 |
|---|---|---|
| WO | WO 03/025446 | 3/2003 |

OTHER PUBLICATIONS

International Search Report.

(Continued)

*Primary Examiner* — Terrell McKinnon
*Assistant Examiner* — Monica Millner
(74) *Attorney, Agent, or Firm* — Harness, Dickey & Pierce, P.L.C.

(57) ABSTRACT

A cable lead-through is disclosed for a switch cabinet, electric cabinet or the like. In at least one embodiment, the cable lead-through is formed of two substantially identical lead-through halves. The lead-through halves are held together by way of two clamping devices. By placing the clamping devices in grooves of the lead-through halves, the cable lead-through is held together.

20 Claims, 3 Drawing Sheets

(56) References Cited

U.S. PATENT DOCUMENTS

| | | | | |
|---|---|---|---|---|
| 6,053,456 | A | * | 4/2000 | Dispenza ........................ 248/56 |
| 6,161,589 | A | * | 12/2000 | Bolotte et al. ................. 138/106 |
| 6,259,033 | B1 | | 7/2001 | Kassulat |
| 6,654,531 | B2 | * | 11/2003 | Gruner-Nielsen et al. ... 385/123 |
| 6,710,248 | B1 | * | 3/2004 | Foschino et al. .............. 174/651 |
| 6,816,372 | B2 | * | 11/2004 | Huettner et al. .............. 361/695 |
| 6,841,021 | B1 | * | 1/2005 | Mesing et al. ................. 156/212 |
| 6,888,067 | B1 | * | 5/2005 | Howland .................... 174/74 R |
| 6,902,138 | B2 | * | 6/2005 | Vantouroux ................. 248/68.1 |
| 7,005,579 | B2 | | 2/2006 | Beele |
| 7,288,730 | B2 | * | 10/2007 | Habel et al. ................... 174/650 |
| 7,371,969 | B2 | * | 5/2008 | Hedstrom ..................... 174/151 |
| 7,806,374 | B1 | * | 10/2010 | Ehmann et al. .............. 248/67.5 |
| 2004/0169341 | A1 | | 9/2004 | Hellkvist |
| 2009/0218451 | A1 | * | 9/2009 | Lundborg ....................... 248/56 |
| 2010/0148018 | A1 | * | 6/2010 | Schoenau et al. ............ 248/74.4 |

OTHER PUBLICATIONS

First Examination Report for corresponding Indian patent application No. 1200/DEL/2007 dated Oct. 4, 2012.

\* cited by examiner

CABLE LEAD-THROUGH DEVICE

TECHNICAL FIELD

The present invention concerns a cable lead-through for a switch cabinet, electric cabinet or the like.

PRIOR ART

In switch cabinets a number of cables are to be received, which cables go through a wall of the cabinet. Normally the switch cabinets have an opening with standardised size for receiving the cables. Furthermore, openings for receiving fastening means for a lead-through are normally distributed in a standardised way. Thus, the lead-throughs are to be adapted to the standardised dimensions.

A lead-through for switch cabinets should seal against water, moist etc. in addition to hold the cables in a secure way.

SUMMARY OF THE INVENTION

One object of the present invention is to have a lead-through that is easy to use and to adapt to cables of different sizes. A further object is that the lead-through should give a tight seal. Further objects are that the lead-through should have relatively few parts, be easy to handle both regarding storing and in use.

The cable lead-through of the present invention is formed of two substantially identical lead-through halves. The lead-through halves are held together side by side by means of two clamping devices placed in grooves in both lead-through halves. The cables are received in openings of the lead-through, where each opening is provided with means giving an adjustable inner diameter.

The lead-through is formed in a suitable way of a plastic material.

Further objects and advantages of the present invention will be obvious for a person skilled in the art when reading the detailed description below of at present preferred embodiments.

BRIEF DESCRIPTION OF THE DRAWINGS

The invention will be described further below by way of examples and with reference to the enclosed drawings. In the drawings.

DETAILED DESCRIPTION OF PREFERRED EMBODIMENTS

Figure 1:
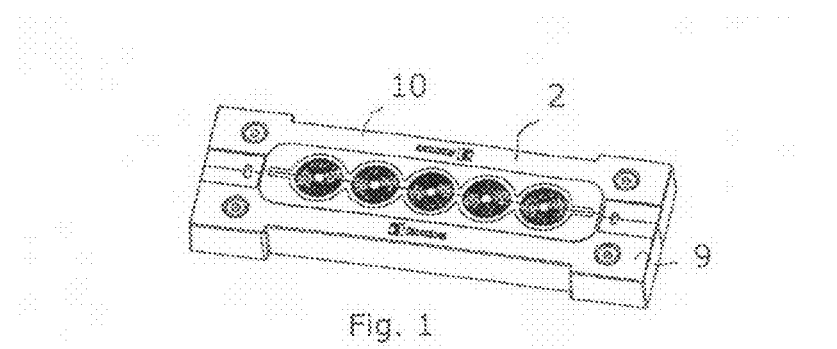
FIG. 1 is a perspective view of a lead-through according to the present invention.
Figure 2:
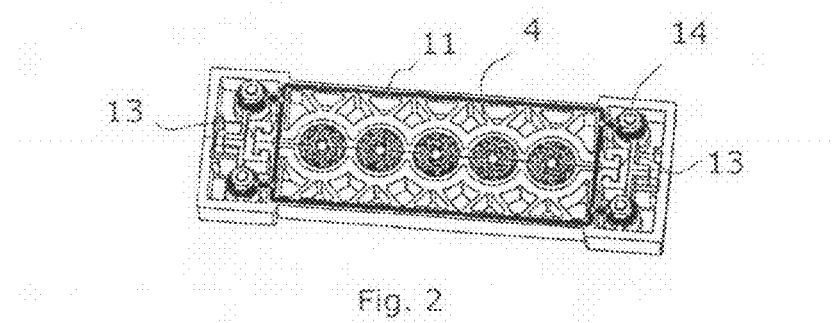
FIG. 2 is a perspective view from the opposite side of the lead-through of FIG. 1.
Figure 3:
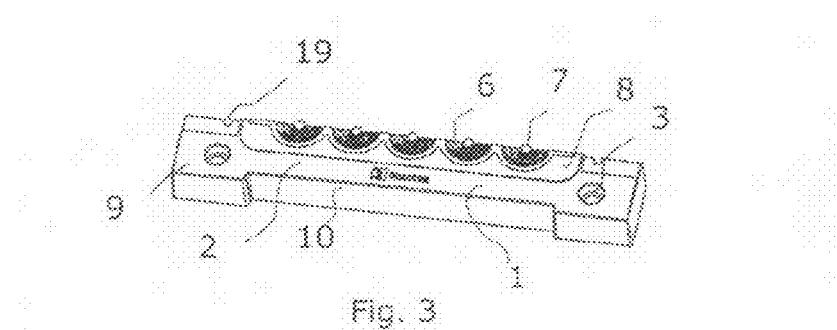
FIG. 3 is a perspective view of a lead-through half according to the present invention.
Figure 4:
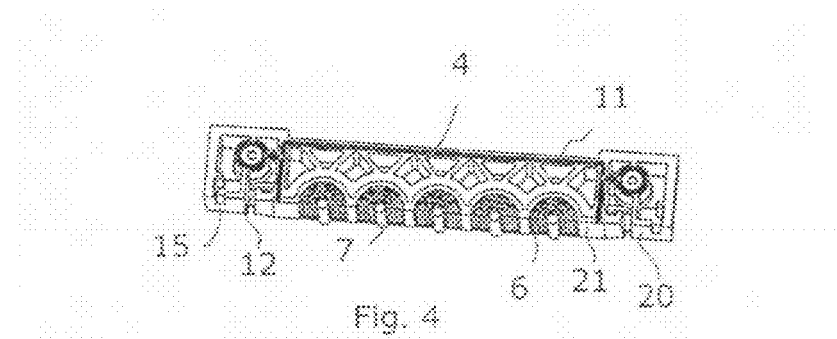
FIG. 4 is a perspective view from the opposite side of the lead-through half of FIG. 3.
Figure 5:
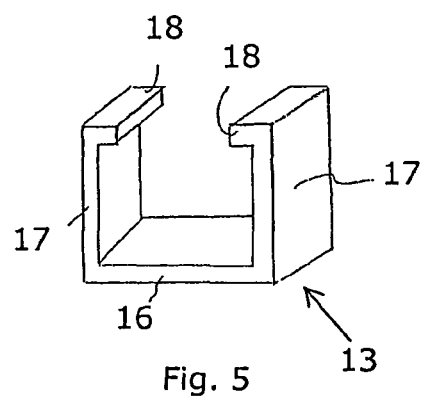
FIG. 5 is a perspective view of a clamp used in the lead-through of FIGS. 1 and 2.
Figure 6:
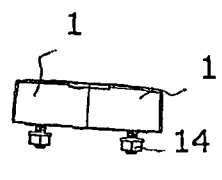
FIG. 6 is an end view of the lead-through of FIGS. 1 and 2.
Figure 7:
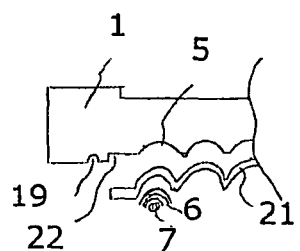
FIG. 7 is an exploded, detailed view of a part of a lead-through, FIG. 8 is a perspective view of a further embodiment of a lead-through according to the present invention.

The lead-through as shown in FIGS. 1-7 is formed of two in principle identical halves 1. Each lead-through half 1 has an outer side 2, which is relatively flat, to give an appealing appearance, and an inner side 4 having the general form of a framework, to save weight and material. As used in this description the outer side 2 means the side of the lead-though facing away from a switch cabinet, electric cabinet or the like, while the inner side 4 is facing inwardly into the switch cabinet, electric cabinet or the like. Each lead-through half 1 has two through openings 3 to receive fastening means 14, often in the form of screw and nut assemblies. The openings 3 are placed at opposite ends of the lead-through half 1. Each lead-through half 1 has a contact surface 20, to be placed against a corresponding contact surface 20 of another lead-through-half 1 when forming a lead-through. Thus, two lead-through halves 1 placed side by side form the lead-through.

On the contact surface 20 of each lead-through half 1 a number of semi cylindrical openings 5 are formed, with a row of openings placed adjacent each other. At each end of the row of semi cylindrical openings 5, a recess 22 is formed in the contact surface 20. A seal 21 is placed in the semi cylindrical openings 5 and in the recesses 22. The form of the seal 21 is adapted to the forms of the openings 5 and the recesses 22 in such a way that the seal 21 follows the bottoms of the semi cylindrical openings 5 and the recesses 22. The seal 21 may protrude from the contact surface 20 at the recesses 22 and in areas between the semi cylindrical openings 5. The seal 21 is made of an elastic material and is attached to the lead-through half 1 by suitable means such as by gluing. Inside the seal 21 a number of peelable sheets 6 are placed in the area of the semi cylindrical openings 5. On one of the lead-through halves 1 blinds 7 are placed in a recess in the middle of the peelable sheets 6. The other lead-through half has no blinds 7, but recesses to accommodate the blinds 7. Thus, the only difference between the lead-through halves is whether they are furnished with blinds 7 or not. The peelable sheets adhere to each other but not more than that the sheets may be peeled of by hand. The packs of peelable sheets 6 are adhered to the seal 21 before or after the seal 21 has been adhered to the lead-through halves 1.

In the shown embodiment each lead-through half 1 has a middle part 10 with a somewhat smaller outer profile than two end parts 9 of the lead-through half 1.

The size of the lead-through halves 1 is adapted to the dimensions of a standard opening in switch cabinets, electric cabinets etc. and possible openings for fastening means. When the lead-through is formed of two lead-through halves 1 the lead-through will safely cover the opening in the switch cabinet, electric cabinet etc.

On the inner side 4 a further seal 11 is arranged going along the outer edge of the middle part 10, on the side opposite the semi cylindrical openings 5, and between the middle part 10 and each end part 9. Furthermore, the seal 11 goes to and around each opening 3 for fastening means, such as screws 14. The seal 11 is normally formed at the manufacture of the cable lead-through. The seal 11 protrudes slightly above the inner side 4 of each lead-through half 1 to go into contact with a wall or the like of an appliance to which the lead-through is attached. The seal 11 is positioned to be placed outside the opening of the switch cabinet, electric cabinet etc.

Two lead-through halves 1 are brought together and then held together by means of two clamps 13, with one clamp 13 at each opposite end of the lead-through. Two locking grooves 12 are arranged in each lead-through half 1 for co-operation with the clamps 13. Each clamp 13 has a cross section with an approximate U-form. Seen in cross section each clamp 13 has a base 16 and two legs 17 at right angles to the base 16. The locking grooves 12 have a corresponding form. A projecting part 18 is arranged at the free end of each leg 17, which projecting part 18 is at right angles to the leg 17 and where the projecting parts 18 of the legs 17 are facing each other. Each lead-through half 1 has a locking groove 12 with a form adapted to the form of the clamp 13. Furthermore, each lead-through half 1 has a retaining groove 15 with the same general form as for the locking groove 12. The purpose of the retaining groove 15 will be explained below.

The locking groove 12 is open all the way at the contact surface 20 of the lead-through half 1 which is to face a corresponding contact surface 20 of another lead-through half 1. Thus, a notch 19 is formed on the outer side 2 of each lead-through half 1. The notches 19 of two lead-through halves 1 will form an opening on the outer side 2 of a formed lead-through. The purpose of such an opening is to facilitate removal of the clamps 13 from the locking grooves 12, for instance by pressing a screwdriver against the clamp 13 through said opening.

The retaining groove 15 is of less depth than the locking groove 12 and said depths are adapted to the height of the clamps 13. The relationship between the depth of the retaining grooves 15 and the clamps 13 is such that the clamps 13 will project above the inner side 4 of the lead-through when received in the retaining grooves 15. When the clamps 13 are received in the locking grooves 12 the clamps will be placed flush with the inner side 4 of the lead-through.

Furthermore, the clamps 13 and the locking grooves 12 have such dimensions that the lead-through halves 1 will be pressed against each other when the clamps 13 are received in the locking grooves 12. Thus, compressing the protruding parts of the insert 21 of each lead-through half 1.

The clamps 13 are placed in the retaining grooves 15 before mounting, i.e. during storing and transportation, in order to keep the lead-through halves 1 together. With the clamps 13 in the retaining grooves 15 the lead-through cannot be mounted in a proper way at a cabinet or the like, as the clamps 13 will hinder that the lead-through is placed against the wall of the cabinet. Before mounting of the lead-through the clamps 13 are moved to the locking grooves 12, whereby the clamps 13 will be flush with the surface of the lead-through. Thus, in that position the clamps 13 will not hinder the lead-through from being placed firmly against a wall of a cabinet.

In use the clamps 13 are taken out of the retaining grooves 15 of the lead-through. To take out the clamps 13 it will normally suffice to compress the lead-through by hand. With the lead-through separated into two lead-through halves 1 the lead-through halves 1 are adapted to the cables to be received. For each cable to be received the blind 7 is first taken out and then a number of the peelable sheets 6 are peeled off. Normally sheets 6 are peeled off from both lead-through halves 1 depending on the outer diameter of the actual cable. The openings formed after peeling off of a number of sheets 6 and the lead-through halves 1 have been brought together should have a diameter slightly smaller than the diameter of the cable. As the cables are somewhat thicker than the openings receiving the cables it is often necessary to use some kind of pliers to press the two lead-through halves 1 together. The lead-through halves 1 have to be pressed together to be able to place the clamps 13 in the locking grooves 12. When the clamps 13 have been received the pliers is taken away and the clamps 13 will keep the lead-through halves 1 compressed against each other. Finally the lead-through may be fixed to the cabinet by means of suitable fastening means 14, such as self-tapping screws or screw and nut assemblies. By means of compression of the further seal 11 surrounding the lead-through at the outer edge a tight seal is formed.

Figure 8:
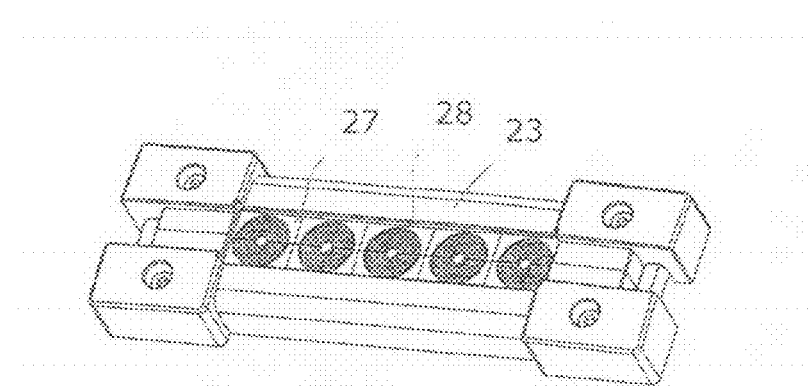
Figure 9:
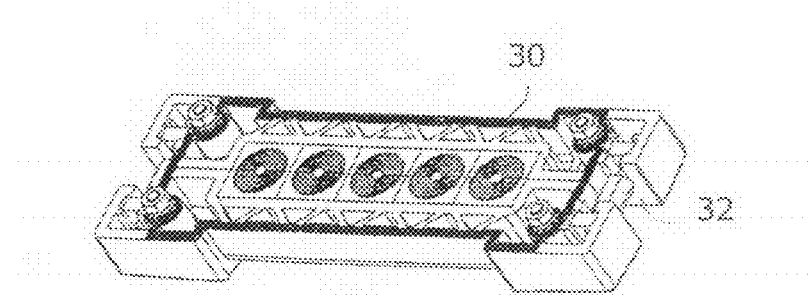
FIG. 9 is a perspective view from the other side of the lead-through of FIG. 8.
Figure 10:
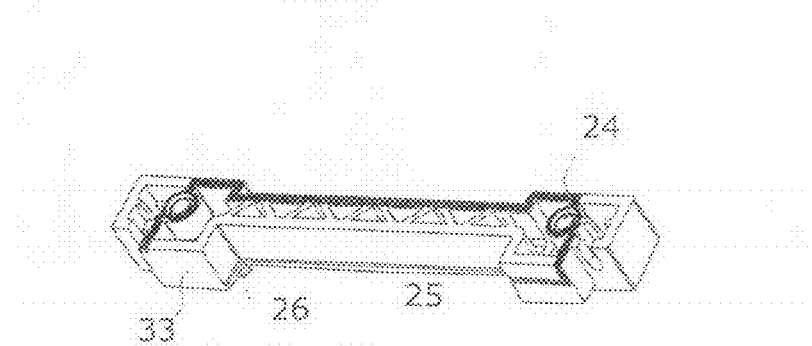
FIG. 10 is a perspective view of a lead-through half of FIGS. 8 and 9 and without modules.
Figure 11:
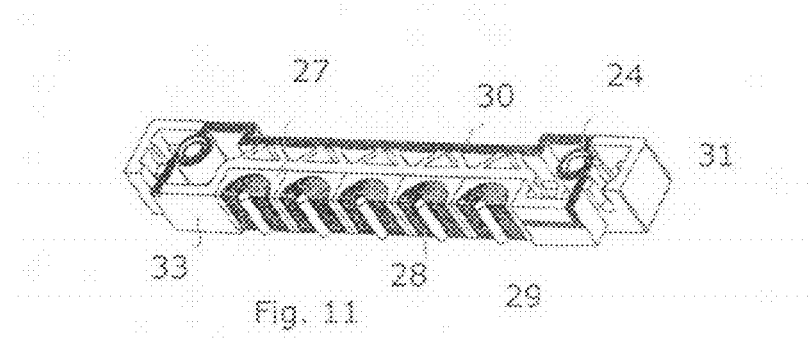
FIG. 11 is a perspective view from the other side of the lead-through half of FIG. 10 and with modules.

In the alternative embodiment of a lead-through according to the present invention, shown in FIGS. 8-11, the general design is basically the same as for the embodiment described above. The lead-through is formed of two in principle identical halves 23. In the same way as described above the lead-through has outer and inner sides, of which the outer side is intended to be facing away from a switch cabinet, electrical cabinet or the like, at which the lead-through is fixed. Each lead-through half 23 has two through openings 24 to receive fastening means, often in the form of screws or screw and nut assemblies.

In this embodiment each lead-through half 23 has a recess, having a bottom 25 and two sides 26, for receiving a number of module halves 27. The module halves 27 are received placed against the bottom 25 and the sides 26 of the recess and against each other. The module halves 27 are parts of modules known in the prior art. Inside each module half 27 a number of peelable sheets 28 are received. In the centre of the peelable sheets 28 a blind 29 is placed in the module halves 27 of one of the lead-through halves 23 intended to be placed against each other in the same way as described above.

The size of the lead-through halves 23 is adapted to the dimensions of a standard opening in switch cabinets, electric cabinets etc. and possible openings for fastening means. When a lead-through is formed of two lead-through halves 23 the lead-through will safely cover the opening in the switch cabinet, electric cabinet etc.

On the inner side of each lead-through half 23 a seal 30 is arranged in the same way as described for the seal 11 of the previous embodiment. However, in this case the seal 30 also goes down on one of contact surfaces 33 on each lead-through half 23. The contact surfaces 33 of two lead-through halves 23 are placed against each other when forming a lead-through. Thus, the seal 30 will seal both against a switch cabinet, electric cabinet etc. and between the lead-through halves 23.

When forming a lead-through the two lead through-halves 23 are held together by means of two clamping screws 32. In the shown embodiment the clamping screws 32 are received in grooves 31 formed at the short ends of each lead-through. Each clamping screw 32 has the form of a central nut having a right hand thread and a left hand thread. A threaded pin is attached to respective thread of the central nut, and a further nut is received on each pin. The clamping screw 32, formed of at least two pins, a central nut and two further nuts, is received in the grooves 31 of the lead-through in such a way that the distance between the central nut and respective further nut will increase or decrease simultaneously depending on the direction of rotation of the central nut. Thus, by means of the clamping screws 32 the modules, possibly receiving cables, may be compressed, together with the part of respective seal 30 placed at the contact surface 33.

A person skilled in the art realises that parts of the different embodiments may be combined in different ways. Thus, it is for example possible to exchange clamping means between the two shown embodiments.

The invention claimed is:
1. A cable lead-through, comprising:
two substantially identical lead-through halves, each including an outer surface;
an inner surface opposite the outer surface;

a contact surface perpendicular to the outer surface and the inner surface, the contact surfaces being configured to receive a cable therebetween and configured to abut one another when the two substantially identical lead-through halves are joined thereby forming the cable lead-through, whereby the outer surface and the inner surface respectively form an outer side and an inner side of the cable lead-through device;

at least one groove formed on the inner surface; and two clamping devices, configured to hold the two substantially identical lead-through halves together, each of the two clamping devices being insertable into the at least one groove from the inner surface of the two substantially identical lead-through halves, wherein the inner side of the cable lead-through device is configured to directly contact a mounting surface to which the cable lead-through device is to be attached.

2. The cable lead-through of claim 1, wherein each of the two substantially identical lead-through halves includes a number of semi cylindrical openings at the contact surface, forming a row of adjacent semi cylindrical openings, and a recess at each end of the row of semi cylindrical openings, wherein the semi cylindrical openings will form cylindrical openings when the two substantially identical lead-through halves are brought together, wherein a seal is placed in the semi cylindrical openings and the recesses and wherein a number of peelable sheets are placed inside the seal in the semi cylindrical openings.

3. The cable lead-through of claim 1, wherein the two clamping devices are in the form of clamps, and wherein each of the two substantially identical lead-through halves includes locking grooves and retaining grooves on the inner side to receive parts of the clamps.

4. The cable lead-through of claim 3, wherein the dimensions of the locking grooves and the clamps are such that an upper surface of each clamp received in the locking groove will be flush with the surface of the inner side of each of the two substantially identical lead-through halves.

5. The cable lead-through of claim 4, wherein a notch is formed in each locking groove at the contact surface, whereby through openings will be formed by the notches when the two substantially identical lead-through halves are brought together to form the cable lead-through.

6. The cable lead-through of claim 3, wherein the dimensions of the retaining grooves and the clamps are such that an upper surface of clamps received in the retaining grooves will project above an upper most surface of the inner side of the formed cable lead-through.

7. The cable lead-through of claim 1, wherein the two clamping devices are clamping screws, received in grooves of each of the two substantially identical lead-through halves, the clamping screws including a central nut having a right hand thread and a left hand thread.

8. The cable lead-through of claim 1, wherein a number of module halves are placed in a recess on each of the two substantially identical lead-through halves, the module halves including a number of peelable sheets.

9. The cable lead-through of claim 1, wherein a seal is placed on the inner side of each of the two substantially identical lead-through halves.

10. The cable lead-through of claim 9, wherein the seal of the cable lead-through surrounds an opening of an appliance to which the cable lead-through is fixed and wherein at least one of the cable lead-through is fixed to the appliance by way of screws received in through openings of the cable lead-through and the seal goes down onto one of the contact surfaces of each of the two substantially identical lead-through halves.

11. Method involving a cable lead-through, comprising:
placing clamps in retaining grooves of two lead-through halves to hold the lead-through together during storing and transportation, the clamps then being removed from the retaining grooves of two lead-through halves and the lead-through halves being separated from each other, wherein after dimensions of openings receiving cables are adapted to a diameter of the cables by pealing off a suitable number of peelable sheets of the openings, the lead-through halves are then brought together and the clamps are placed in locking grooves of the lead-through halves; and fixing the cable lead-through to a cabinet.

12. The method of claim 11, wherein the lead-through halves are pressed together by hand or by way of pliers when the clamps are placed in or removed from the retaining and locking grooves, respectively.

13. The method of claim 11, wherein the clamps are removed from the locking grooves by way of a tool pressed against the clamps through a through opening formed in the bottom of each locking groove.

14. The cable lead-through of claim 2, wherein the two clamping devices are in the form of clamps, and wherein each of the two substantially identical lead-through halves includes locking grooves and retaining grooves on the inner side to receive parts of the clamps.

15. The cable lead-through of claim 14, wherein the dimensions of the locking grooves and the clamps are such that an upper surface of each clamp received in the locking groove will be flush with the surface of the inner side of each of the two substantially identical lead-through halves.

16. The cable lead-through of claim 15, wherein a notch is formed in each locking groove at the contact surface, whereby through openings will be formed by the notches when the two substantially identical lead-through halves are brought together to form the lead-through.

17. Method involving a cable lead-through, comprising:
removing clamps from the retaining grooves of two lead-through halves, the clamps being usable to hold the cable lead-through together during storing and transportation, and separating the lead-through halves from each other;
bringing the lead-through halves together, after dimensions of openings receiving cables are adapted to a diameter of the cables by pealing off a suitable number of peelable sheets of the openings, and placing the clamps in locking grooves of the lead-through halves; and
fixing the cable lead-through to a cabinet.

18. The method of claim 17, wherein the lead-through halves are pressed together by hand or by way of pliers when the clamps are placed in or removed from the retaining and locking grooves, respectively.

19. The method of claim 17, wherein the clamps are removed from the locking grooves by way of a tool pressed against the clamps through a through opening formed in the bottom of each locking groove.

20. The cable lead-through of claim 1, wherein the respective outer surfaces of the two substantially identical lead-through halves form a contiguous exterior surface when placed side by side.

* * * * *

UNITED STATES PATENT AND TRADEMARK OFFICE
CERTIFICATE OF CORRECTION

| | | |
|---|---|---|
| PATENT NO. | : 8,616,506 B2 | Page 1 of 1 |
| APPLICATION NO. | : 12/451700 | |
| DATED | : December 31, 2013 | |
| INVENTOR(S) | : Stefan Milton | |

It is certified that error appears in the above-identified patent and that said Letters Patent is hereby corrected as shown below:

Title Page, Item (75) should read

-- (75)    Inventor:    Stefan Milton, Ramdala (SE) --.

Signed and Sealed this
Eighth Day of April, 2014

Michelle K. Lee
*Deputy Director of the United States Patent and Trademark Office*